United States Patent
Suggs (10) Patent No.: US 10,168,897 B2
(45) Date of Patent: Jan. 1, 2019

(54) TOUCH INPUT ASSOCIATION

(71) Applicant: Hewlett-Packard Development Company, L.P., Houston, TX (US)

(72) Inventor: Bradley Neal Suggs, Sunnyvale, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 324 days.

(21) Appl. No.: 14/914,956

(22) PCT Filed: Aug. 30, 2013

(86) PCT No.: PCT/US2013/057549
§ 371 (c)(1),
(2) Date: Feb. 26, 2016

(87) PCT Pub. No.: WO2015/030795
PCT Pub. Date: Mar. 5, 2015

(65) Prior Publication Data
US 2016/0210039 A1    Jul. 21, 2016

(51) Int. Cl.
*G06F 3/0488* (2013.01)
*G06F 3/042* (2006.01)
(Continued)

(52) U.S. Cl.
CPC .......... *G06F 3/04883* (2013.01); *G06F 3/017* (2013.01); *G06F 3/038* (2013.01);
(Continued)

(58) Field of Classification Search
CPC ...... G06F 3/0425; G06F 3/0421; G06F 3/042; G06F 3/0426; G06F 3/01; G06F 3/011;
(Continued)

(56) References Cited

U.S. PATENT DOCUMENTS

| 7,023,536 B2 | 4/2006 | Zhang et al. |
| 7,038,846 B2 | 5/2006 | Mandella et al. |

(Continued)

FOREIGN PATENT DOCUMENTS

| CN | 102985896 A | 3/2013 |
| EP | 0626636 A3 | 2/1996 |

(Continued)

OTHER PUBLICATIONS

Bamboo, User's Manual: Bamboo (CTH-470, CTH-670), Bamboo Pen (CTL-470), etc., Version 1.0, Rev G1511, Aug. 25, 2011, pp. 1-95, Wacom Co., Ltd.
(Continued)

*Primary Examiner* — David Tung
(74) *Attorney, Agent, or Firm* — HP Inc. Patent Department (57) ABSTRACT

In one example in accordance with the present disclosure, a method conducted by a projective computing system is provided. The method includes displaying a first interface on a vertical display, projecting a second interface on a horizontal touch sensitive mat, receiving a touch input modification request, and changing the touch input association from the horizontal touch sensitive mat to the vertical display such that a touch input on the horizontal touch sensitive mat controls the first interface displayed on the vertical display.

13 Claims, 7 Drawing Sheets

(51) Int. Cl.
*G06F 3/01* (2006.01)
*G06F 3/038* (2013.01)
*G06F 3/0487* (2013.01)
*G06F 1/16* (2006.01)
*G06F 3/14* (2006.01)

(52) U.S. Cl.
CPC .......... *G06F 3/0421* (2013.01); *G06F 3/0425* (2013.01); *G06F 3/0487* (2013.01); *G06F 3/0488* (2013.01); *G06F 1/1639* (2013.01); *G06F 1/1647* (2013.01); *G06F 3/1423* (2013.01); *G06F 2203/04803* (2013.01)

(58) Field of Classification Search
CPC .................... G06F 3/014; G06F 3/017; G06F 3/0488–3/04886; G09G 2300/02–2300/026
See application file for complete search history.

(56) References Cited

U.S. PATENT DOCUMENTS

| | | |
|---|---|---|
| 7,088,440 B2 | 8/2006 | Buermann et al. |
| 7,110,100 B2 | 9/2006 | Buermann et al. |
| 7,113,270 B2 | 9/2006 | Buermann et al. |
| 7,154,483 B2 | 12/2006 | Kobayashi |
| 7,161,664 B2 | 1/2007 | Buermann et al. |
| 7,203,384 B2 | 4/2007 | Carl et al. |
| 7,268,956 B2 | 9/2007 | Mandella et al. |
| 7,474,809 B2 | 1/2009 | Carl et al. |
| 7,599,561 B2 | 10/2009 | Wilson et al. |
| 7,710,391 B2 | 5/2010 | Bell et al. |
| 7,729,515 B2 | 6/2010 | Mandella et al. |
| 7,826,641 B2 | 11/2010 | Mandella et al. |
| 7,961,909 B2 | 6/2011 | Mandella et al. |
| 8,121,640 B2 | 2/2012 | Russ et al. |
| 8,199,117 B2 | 6/2012 | Izadi et al. |
| 8,736,583 B2 | 5/2014 | Anderson et al. |
| 2005/0078092 A1 | 4/2005 | Clapper |
| 2005/0168437 A1 | 8/2005 | Carl et al. |
| 2008/0018591 A1 | 1/2008 | Pittel et al. |
| 2009/0115721 A1* | 5/2009 | Aull ........................ G06F 3/017 345/156 |
| 2010/0001968 A1 | 1/2010 | Lee |
| 2011/0163944 A1 | 7/2011 | Bilbrey et al. |
| 2011/0227915 A1 | 9/2011 | Mandella et al. |
| 2011/0242054 A1 | 10/2011 | Tsu |
| 2012/0038549 A1 | 2/2012 | Mandella et al. |
| 2012/0235922 A1 | 9/2012 | Locker et al. |
| 2012/0262379 A1 | 10/2012 | King |
| 2013/0044075 A1 | 2/2013 | Utsugi et al. |
| 2013/0077236 A1 | 3/2013 | Becze et al. |
| 2013/0141331 A1* | 6/2013 | Shiu ........................ G09G 5/003 345/158 |
| 2013/0194418 A1 | 8/2013 | Gonzalez-Banos et al. |
| 2013/0222238 A1* | 8/2013 | Sliger ................... G06F 3/0484 345/157 |

FOREIGN PATENT DOCUMENTS

| | | |
|---|---|---|
| EP | 2565751 A1 | 3/2013 |
| KR | 100987461 B1 | 10/2010 |
| TW | 200743010 A | 11/2007 |
| TW | 201137694 A | 11/2011 |
| TW | 201243646 A1 | 11/2012 |
| WO | WO-01/59975 A3 | 8/2001 |
| WO | WO-03/054683 A2 | 3/2003 |
| WO | WO-2012/009039 A1 | 1/2012 |
| WO | WO-2012009039 A1 | 1/2012 |
| WO | WO-2012/176142 A2 | 12/2012 |

OTHER PUBLICATIONS

Gao, Rui et al; Microsoft Research-Mobile Surface; Microsoft Research; 2010; http://research.microsoft.com/en-us/projects/mobilesurface/—1 page.

Hand, Randall; Infinite Z Launches zSpace Virtual Holographic 3D Display for Designers; VizWorld.com; Dec. 13, 2011; 2 pages.

Harrison, Beverly & Ziola, Ryder; Bringing Toys to Life: Intel Labs OASIS Project; Augmented Engineering; Jan. 6, 2011; 1 page.

Harrison, Chris et al; OmniTouch; Wearable Multitouch Interaction Everywhere; UIST'11: Oct. 16, 2011; 10 pages.

Hartmann, Bjorn et al; Pictionaire: Supporting Collaborative Design Work by Integrating Physical and Digital Artifacts; CSCW 2010; Feb. 6, 2010; 4 pages.

Hinckley, Ken et al; Pen + Touch = New Tools; UIST'10; Oct. 3, 2010; 10 pages.

Junuzovic, Sasa et al; Microsoft Research-IllumiShare; Microsoft Research; 2012; http://delivery.acm.org—2 pages.

Kane, Shaun K. et al; Bonfire; A Nomadic System for Hybrid Laptop-Tabletop Interaction; UIST'09; Oct. 4, 2009—10 pages.

Linder, Natan et al; LuminAR: Portable Robotic Augmented Reality Interface Design and Prototype; UIST '10, Oct. 3, 2010; 2 pages.

Melanson, Donald; Microsoft Research Working on Portable Surface; Mar. 2, 2010; http://www.engadget.com—[ages.

Melanson, Donald; Wiimote Repurosed for Multi-Point Interactive Whiteboard; Dec. 10, 2007; http://www.engadget.com—2 pages.

PCT Search Report/Written Opinion—Application No. PCT/US2013/057549 dated May 26, 2014—13 pages.

Shahram et al., "C-Slate: A Multi-Touch and Object Recognition System for Remote Collaboration using Horizontal Surface," 2007, pp. 3-10, IEEE.

Simonite, Tom; A Kitchen Countertop With a Brain; MIT Technology Review; Jul. 2, 2010; http://www.technologyreview.com—2 pages.

Wilson, Andrew D. et al; Combining Multiple Depth Cameras and Projectors for Interactions on, Above, and Between, Surfaces; UIST'10; Oct. 3, 2010; 10 pages.

Wilson, Andrew D.; Using a Depth Camera As a Touch Sensor; ITS 2010: Devices & Algorithms; Nov. 7, 2010; 4 pages.

* cited by examiner

TOUCH INPUT ASSOCIATION

BACKGROUND

Computer systems typically employ a display or multiple displays which are mounted on a support stand and/or are incorporated into some other component of the computer system. For displays employing touch sensitive technology (e.g., touch screens), it is often desirable for a user to interact directly with such displays in order to fully utilize such touch technology during system operations. However, optimum ergonomic placement of a display for simply viewing an image thereon is often at odds with such placement for engaging in touch interaction therewith. Thus, users desiring to use a single computer system for both traditional viewing applications as well as touch interactive application often encounter difficulties in positioning and/or utilizing such systems.

BRIEF DESCRIPTION OF THE DRAWINGS

For a detailed description of various examples, reference will now be made to the accompanying drawings in which.

NOTATION AND NOMENCLATURE

Certain terms are used throughout the following description and claims to refer to particular system components. As one skilled in the art will appreciate, computer companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ." Also the term "couple" or "couples" is intended to mean either an indirect or direct connection. Thus, if a first device couples to a second device, that connection may be through a direct electrical or mechanical connection, through an indirect electrical or mechanical connection via other devices and connections, through an optical electrical connection, or through a wireless electrical connection. As used herein the term "approximately" means plus or minus 10%. In addition, as used herein, the phrase "user input device" refers to any suitable device for providing an input, by a user, into an electrical system such as, for example, a mouse, keyboard, a hand (or any finger thereof), a stylus, a pointing device, etc. Furthermore, the term "vertical" is intended to mean upright and approximately perpendicular to the plane of the horizon. In addition, the term "horizontal" is intended to mean approximately parallel to the plane of the horizon.

DETAILED DESCRIPTION

The following discussion is directed to various examples of the disclosure. Although one or more of these examples may be preferred, the examples disclosed should not be interpreted, or otherwise used, as limiting the scope of the disclosure, including the claims. In addition, one skilled in the art will understand that the following description has broad application, and the discussion of any example is meant only to be descriptive of that example, and not intended to intimate that the scope of the disclosure, including the claims, is limited to that example.

Referring now to FIGS. 1-4, a projective computing system 100 in accordance with the principles disclosed herein is shown. In this example, system 100 generally comprises a support structure 110, a computing device 150, a projector unit 180, and a touch sensitive mat 200. Computing device 150 may comprise any suitable computing device while still complying with the principles disclosed herein. For example, in some implementations, device 150 may comprise an electronic display, a smartphone, a tablet, an all-in-one computer (i.e., a display that also houses the computers board), or some combination thereof. In this example, device 150 is an all-in-one computer that includes a central axis or center line 155, first or top side 150a, a second or bottom side 150b axially opposite the top side 150a, a front side 150c extending axially, between the sides 150a, 150b, a rear side also extending axially between the sides 150a, 150b and generally radially opposite the front side 150c. A display 152 defines a viewing surface and is disposed along the front side 150c to project images for viewing and interaction by a user (not shown). In some examples, display 152 is not touch sensitive. In other examples, display 152 includes touch sensitive technology such as, for example, resistive, capacitive, acoustic wave, infrared (IR), strain gauge, optical, acoustic pulse recognition, or some combination thereof. Therefore, throughout the following description, display 152 may periodically be referred to as a touch sensitive or non-touch sensitive surface or display. In addition, in some examples, device 150 further includes a camera 154 that is to take images of a user while he or she is positioned in front of display 152. In some implementations, camera 154 is a web camera. Further, in some examples, device 150 also includes a microphone or similar device that is arranged to receive sound inputs (e.g., voice) from a user during operation.

Referring still to FIGS. 1-4, support structure 110 includes a base 120, an upright member 140, and a top 160. Base 120 includes a first or front end 120a, and a second or rear end 120b. During operation, base 120 engages with a support surface 15 to support the weight of at least a portion of the components (e.g., member 140, unit 180, device 150, top 160, etc.) of system 100 during operation. In this example, front end 120a of base 120 includes a raised portion 122 that is slightly separated above the support surface 15 thereby creating a space or clearance between portion 122 and surface 15. As will be explained in more detail below, during operation of system 100, one side of mat 200 is received within the space formed between portion 122 and surface 15 to ensure proper alignment of mat 200. However, it should be appreciated that in other examples, other suitable alignments methods or devices may be used while still complying with the principles disclosed herein.

Upright member 140 includes a first or upper end 140a, a second or lower end 140b opposite the upper end 140a, a first or front side 140c extending between the ends 140a, 140b, and a second or rear side 140d opposite the front side 140c and also extending between the ends 140a, 140b. The lower end 140b of member 140 is coupled to the rear end 120b of base 120, such that member 140 extends substantially upward from the support surface 15.

Top 160 includes a first or proximate end 160a, a second or distal end 160b opposite the proximate end 160a, a top surface 160c extending between the ends 160a, 160b, and a bottom surface 160d opposite the top surface 160c and also extending between the ends 160a, 160b. Proximate end 160a of top 160 is coupled to upper end 140a of upright member 140 such that distal end 160b extends outward therefrom. As a result, in the example shown in FIG. 2, top 160 is supported only at end 160a and thus is referred to herein as a "cantilevered" top. In some examples, base 120, member 140, and top 160 are all monolithically formed; however, it should be appreciated that in other example, base 120, member 140, and/or top 160 may not be monolithically formed while still complying with the principles disclosed herein.

Referring still to FIGS. 1-4, mat 200 includes a central axis or centerline 205, a first or front side 200a, and a second or rear side 200b axially opposite the front side 200a. In this example, a touch sensitive surface 202 is disposed on mat 200 and is substantially aligned with the axis 205. Surface 202 may comprise any suitable touch sensitive technology for detecting and tracking one or multiple touch inputs by a user in order to allow the user to interact with software being executed by device 150 or some other computing device (not shown). For example, in some implementations, surface 202 may utilize known touch sensitive technologies such as, for example, resistive, capacitive, acoustic wave, infrared, strain gauge, optical, acoustic pulse recognition, or some combination thereof while still complying with the principles disclosed herein. In addition, in this example, surface 202 extends over only a portion of mat 200 however, it should be appreciated that in other examples, surface 202 may extend over substantially all of mat 200 while still complying with the principles disclosed herein. Furthermore, in some examples discussed further below with reference to FIGS. 7-10, a touch input on the mat 200 may be associated with either the horizontal interface projected on the mat 200 or with vertical interface provided by the display 152, depending on the user's preference. Hence, a user may optionally utilize the touch on the horizontal mat 200 to control the interface provided by the vertical display 152.

During operation, mat 200 is aligned with base 120 of structure 110, as previously described to ensure proper alignment thereof. In particular, in this example, rear side 200b of mat 200 is placed between the raised portion 122 of base 120 and support surface 15 such that rear end 200b is aligned with front side 120a of base, thereby ensuring proper overall alignment of mat 200, and particularly surface 202, with other components within system 100. In some examples, mat 200 is aligned with device 150 such that the center line 155 of device 150 is substantially aligned with center line 205 of mat 200; however, other alignments are possible. In addition, as will be described in more detail below, in at least some examples surface 202 of mat 200 and device 150 are electrically coupled to one another such that user inputs received by surface 202 are communicated to device 150. Any suitable wireless or wired electrical coupling or connection may be used between surface 202 and device 150 such as, for example, WI-FI, BLUETOOTH®, ultrasonic, electrical cables, electrical leads, electrical spring-loaded pogo pins with magnetic holding force, or some combination thereof, while still complying with the principles disclosed herein. In this example, exposed electrical contacts disposed on rear side 200b of mat 200 engage with corresponding electrical pogo-pin leads within portion 122 of base 120 to transfer signals between device 150 and surface 202 during operation. In addition, in this example, the electrical contacts are held together by adjacent magnets located in the clearance between portion 122 of base 120 and surface 15, previously described, to magnetically attract and hold (e.g., mechanically) a corresponding ferrous and/or magnetic material disposed along rear side 200b of mat 200.

Figure 1:
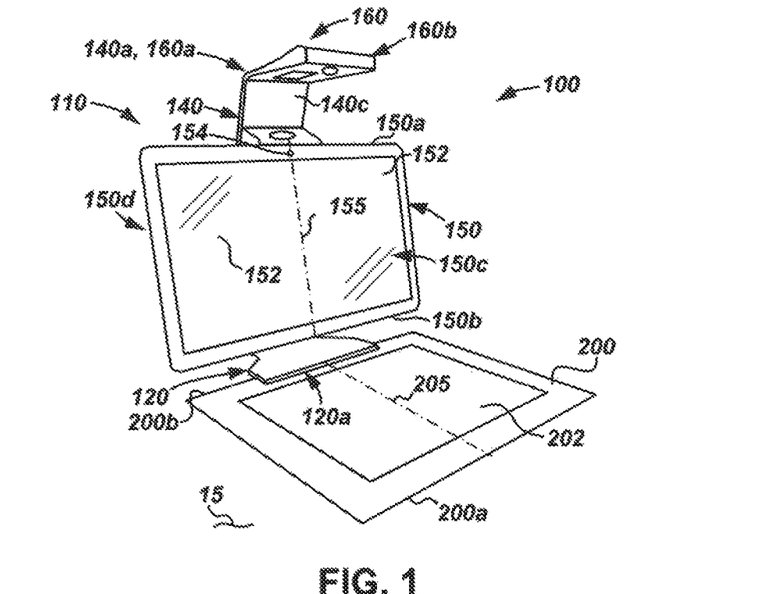
FIG. 1 is a schematic perspective view of an example of a projective computer system in accordance with the principles disclosed herein.
Figure 2:
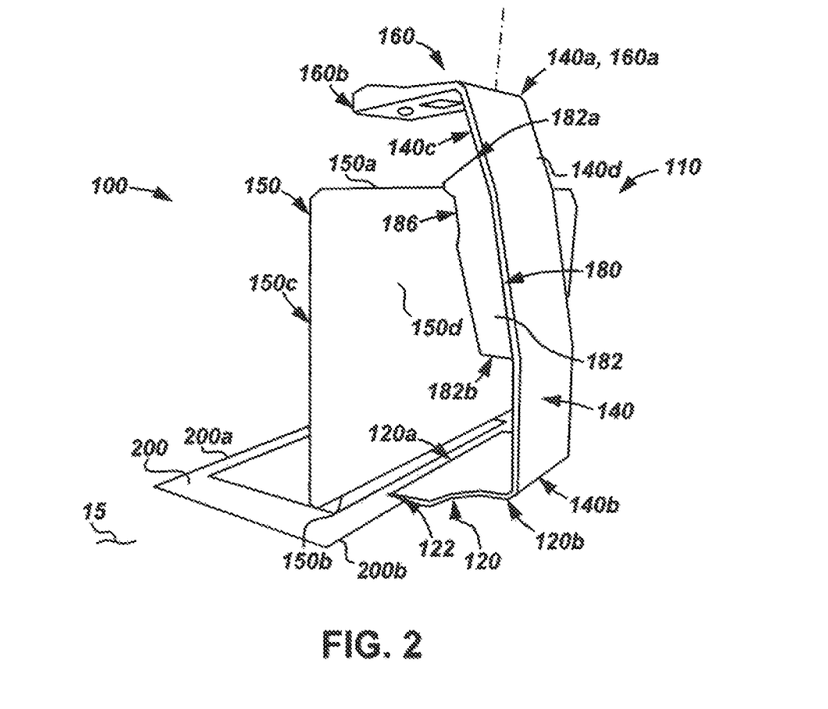
FIG. 2 is another schematic perspective view of the computer system of FIG. 1 in accordance with the principles disclosed herein.
Figure 3:
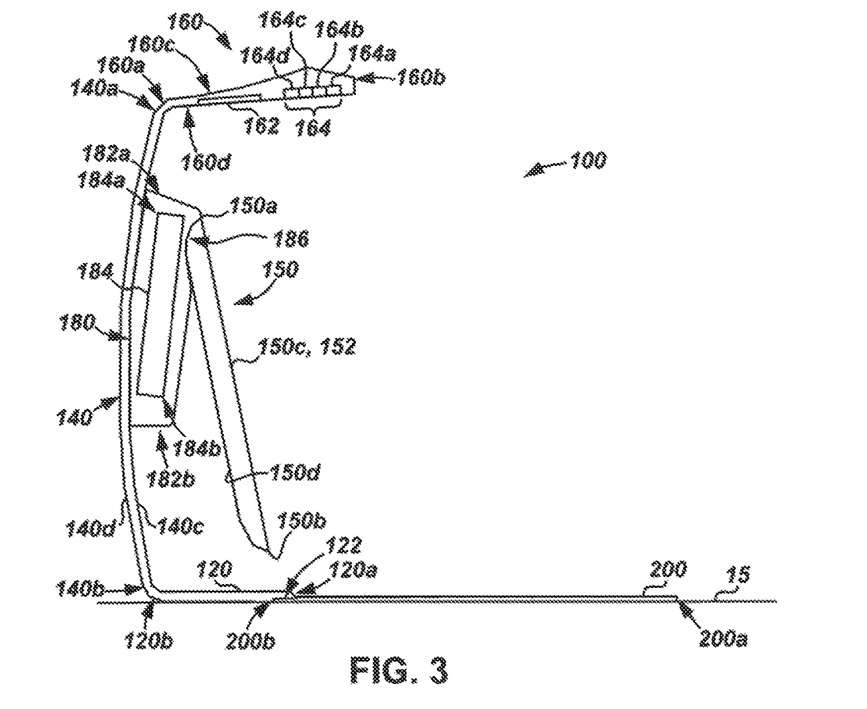
FIG. 3 is a schematic side view of the computer system of FIG. 1 in accordance with the principles disclosed herein.

Referring specifically now to FIG. 3, projector unit 180 comprises an outer housing 182, and a projector assembly 184 disposed within housing 182. Housing 182 includes a first or upper end 182a, a second or lower end 182b opposite the upper end 182a, and an inner cavity 183. In this embodiment, housing 182 further includes a coupling or mounting member 186 to engage with and support device 150 during operations. In general, member 186 may be any suitable member or device for suspending and supporting a computer device (e.g., device 150) while still complying with the principles disclosed herein. For example, in some implementations, member 186 comprises hinge that includes an axis of rotation such that a user (not shown) may rotate device 150 about the axis of rotation to attain an optimal viewing angle therewith. Further, in some examples, device 150 is permanently or semi-permanently attached to housing 182 of unit 180. For example, in some implementations, the housing 180 and device 150 are integrally and/or monolithically formed as a single unit.

Figure 4:
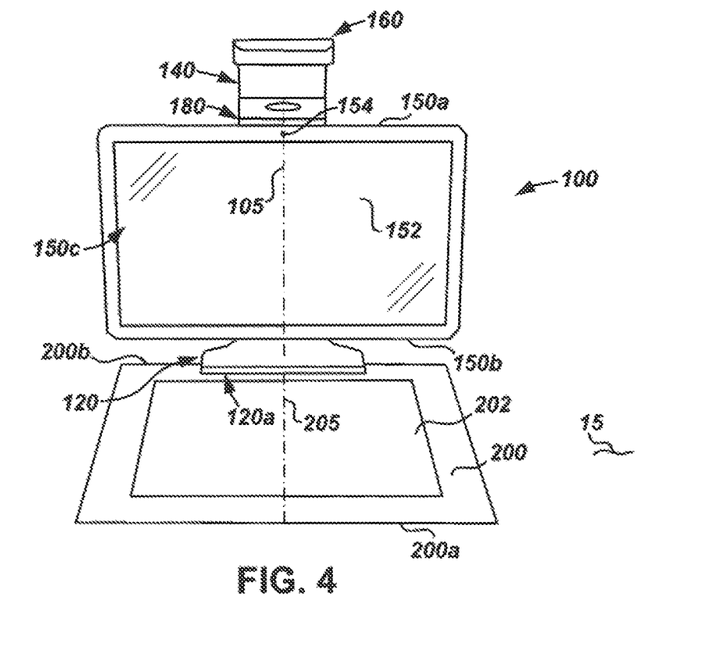
FIG. 4 is a schematic front view of the computer system of FIG. 1 in accordance with the principles disclosed herein.

Thus, referring briefly to FIG. 4, when device 150 is suspended from structure 110 through the mounting member 186 on housing 182, projector unit 180 (i.e., both housing 182 and assembly 184) is substantially hidden behind device 150 when system 100 is viewed from a viewing surface or viewing angle that is substantially facing display 152 disposed on front side 150c of device 150. In addition, as is also shown in FIG. 4, when device 150 is suspended from structure 110 in the manner described, projector unit 180 (i.e., both housing 182 and assembly 184) and any image projected thereby is substantially aligned or centered with respect to the center line 155 of device 150.

Projector assembly 184 is generally disposed within cavity 183 of housing 182, and includes a first or upper end 184a, a second or lower end 184b opposite the upper end 184a. Upper end 184a is proximate upper end 182a of housing 182 while lower end 184b is proximate lower end 182b of housing 182. Projector assembly 184 may comprise any suitable digital light projector assembly for receiving data from a computing device (e.g., device 150) and projecting an image or images (e.g., out of upper end 184a) that correspond with that input data. For example, in some implementations, projector assembly 184 comprises a digital light processing (DLP) projector or a liquid crystal on silicon (LCoS) projector which are advantageously compact and power efficient projection engines capable of multiple display resolutions and sizes, such as, for example, standard XGA (1024×768) resolution 4:3 aspect ratio or standard WXGA (1280×800) resolution 16:10 aspect ratio. Projector assembly 184 is further electrically coupled to device 150 in order to receive data therefrom for producing light and images from end 184a during operation. Projector assembly 184 may be electrically coupled to device 150 through any suitable type of electrical coupling while still complying with the principles disclosed herein. For example, in some implementations, assembly 184 is electrically coupled to device 150 through an electric conductor, WI-FI, BLUETOOTH®, an optical connection, an ultrasonic connection, or some combination thereof. In this example, device 150 is electrically coupled to assembly 184 through electrical leads or conductors (previously described) that are disposed within mounting member 186 such that when device 150 is suspended from structure 110 through member 186, the electrical leads disposed within member 186 contact corresponding leads or conductors disposed on device 150.

Referring still to FIG. 3, top 160 further includes a fold mirror 162 and a sensor bundle 164. Mirror 162 includes a highly reflective surface 162a that is disposed along bottom surface 160d of top 160 and is positioned to reflect images and/or light projected from upper end 184a of projector assembly 184 toward mat 200 during operation. Mirror 162 may comprise any suitable type of mirror or reflective surface while still complying with the principles disclosed herein. In this example, fold mirror 162 comprises a standard front surface vacuum metalized aluminum coated glass mirror that acts to fold light emitted from assembly 184 down to mat 200. In other examples, mirror 162 could have a complex aspherical curvature to act as a reflective lens element to provide additional focusing power or optical correction.

Sensor bundle 164 includes a plurality of sensors and/or cameras to measure and/or detect various parameters occurring on or near mat 200 during operation. For example, in the specific implementation depicted in FIG. 3, bundle 164 includes an ambient light sensor 164a, a camera (e.g., a visual RGB 14.1 megapixel high resolution camera) 164b, a depth sensor or camera 164c, and a three dimensional (3D) user interface sensor 164d. Ambient light sensor 164a is arranged to measure the intensity of light of the environment surrounding system 100, in order to, in some implementations, adjust the camera's and/or sensor's (e.g., sensors 164a, 164b, 164c, 164d) exposure settings, and/or adjust the intensity of the light emitted from other sources throughout system such as, for example, projector assembly 184, display 152, etc. Camera 164b may, in some instances, comprise a color camera which is arranged to take either a still image or a video of an object 40 (e.g., a document, photo, book, 2D object, and/or 3D object) disposed on mat 200. For example, the camera 164b may be a visual 14.1 megapixel RBG camera. Depth sensor 164c generally indicates when a 3D object is on the work surface. In particular, depth sensor 164c may sense or detect the presence, shape, contours, motion, and/or the 3D depth of an object (or specific feature(s) of an object) placed on mat 200 during operation. Thus, in some implementations, sensor 164c may employ any suitable sensor or camera arrangement to sense and detect a 3D object and/or the depth values of each pixel (whether infrared, color, or other) disposed in the sensor's field-of-view (FOV). For example, in some implementations sensor 164c may comprise a single infrared (IR) camera sensor with a uniform flood of IR light, a dual IR camera sensor with a uniform flood of IR light, structured light depth sensor technology, time-of-flight (TOF) depth sensor technology, or some combination thereof. User interface sensor 164d includes any suitable device or devices (e.g., sensor or camera) for tracking a user input device such as, for example, a hand, stylus, pointing device, etc. In some implementations, sensor 164d includes a pair of cameras which are arranged to stereoscopically track the location of a user input device (e.g., a stylus) as it is moved by a user about the mat 200, and particularly about surface 202 of mat 200. In other examples, sensor 164d may also or alternatively include an infrared camera(s) or sensor(s) that is arranged to detect infrared light that is either emitted or reflected by a user input device. It should further be appreciated that bundle 164 may comprise other sensors and/or cameras either in lieu of or in addition to sensors 164a, 164b, 164c, 164d, previously described. In addition, as will explained in more detail below, each of the sensors 164a, 164b, 164c, 164d within bundle 164 is electrically and communicatively coupled to device 158 such that data generated within bundle 164 may be transmitted to device 150 and commands issued by device 150 may be communicated to the sensors 164a, 164b, 164c, 164d during operations. As is explained above for other components of system 100, any suitable electrical and/or communicative coupling may be used to couple sensor bundle 164 to device 150 such as for example, an electric conductor, WI-FI, BLUETOOTH®, an optical connection, an ultrasonic connection, or some combination thereof. In this example, electrical conductors are routed from bundle 164, through top 160, upright member 140, and projector unit 180 and into device 150 through the leads that are disposed within mounting member 186, previously described.

Figure 5:
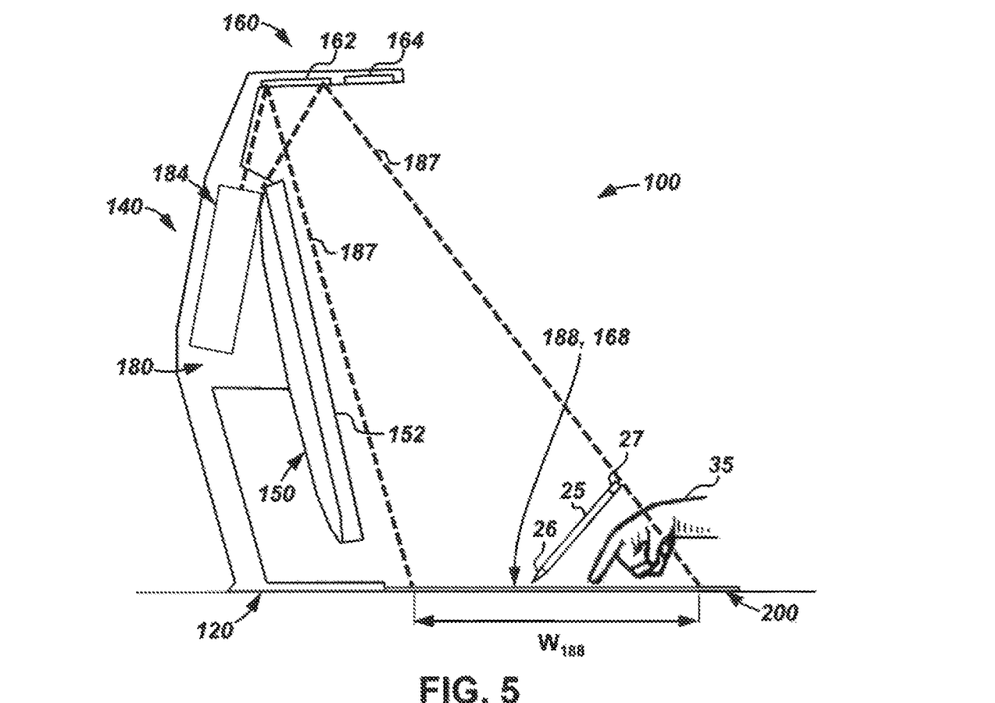
FIG. 5 is a schematic side view of the computer system of FIG. 1 during operation in accordance with the principles disclosed herein.
Figure 6:
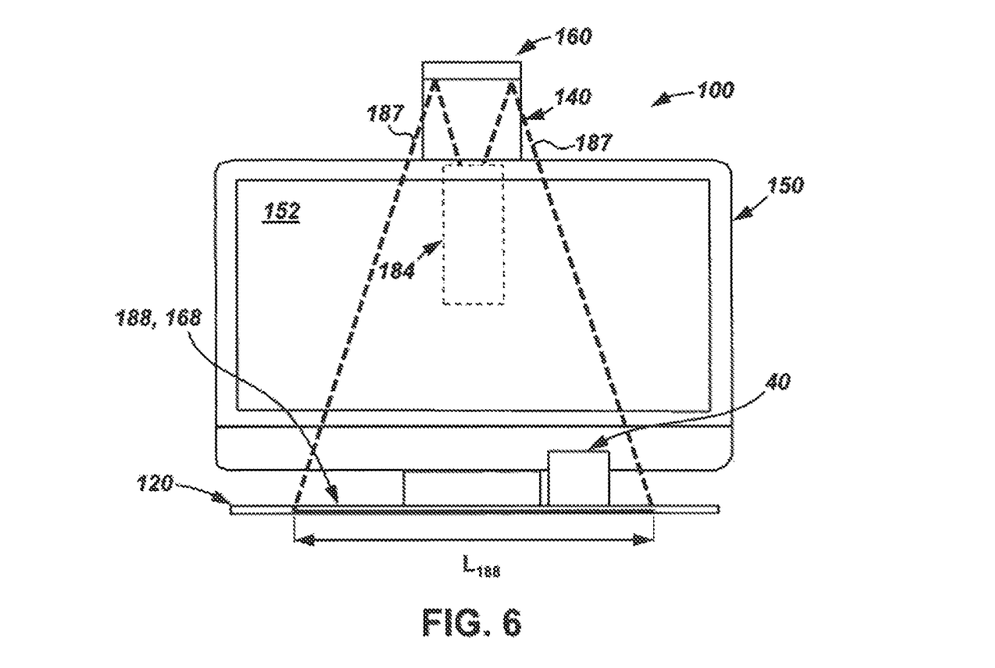
FIG. 6 is a schematic front view of the system of FIG. 1 during operation in accordance with the principles disclosed herein.

Referring now to FIGS. 5 and 6, during operation of system 100, light 187 is emitted from projector assembly 184 and reflected off of mirror 162 towards mat 200 thereby displaying an image and/or user interface on a projector display space 188. In this example, space 188 is substantially rectangular and is defined by a length $L_{188}$ and a width $W_{188}$. In some examples length $L_{188}$ may equal approximately 16 inches, while width $W_{188}$ may equal approximately 12 inches; however, it should be appreciated that other values for both length $L_{188}$ and width $W_{188}$ may be used while still complying with the principles disclosed herein. In addition, the sensors (e.g., sensors 164a, 164b, 164c, 164d) within bundle 164 include a sensed space 168 that, in at least some examples, overlaps and/or corresponds with projector display space 188, previously described. Space 168 defines the area that the sensors within bundle 164 are arranged to monitor and/or detect the conditions thereof in the manner previously described. In some examples, both space 188 and space 168 coincide or correspond with surface 202 of mat 200, previously described, to effectively integrate the functionality of the touch sensitive surface 202, projector assembly 184, and sensor bundle 164 within a defined area.

Figure 7:
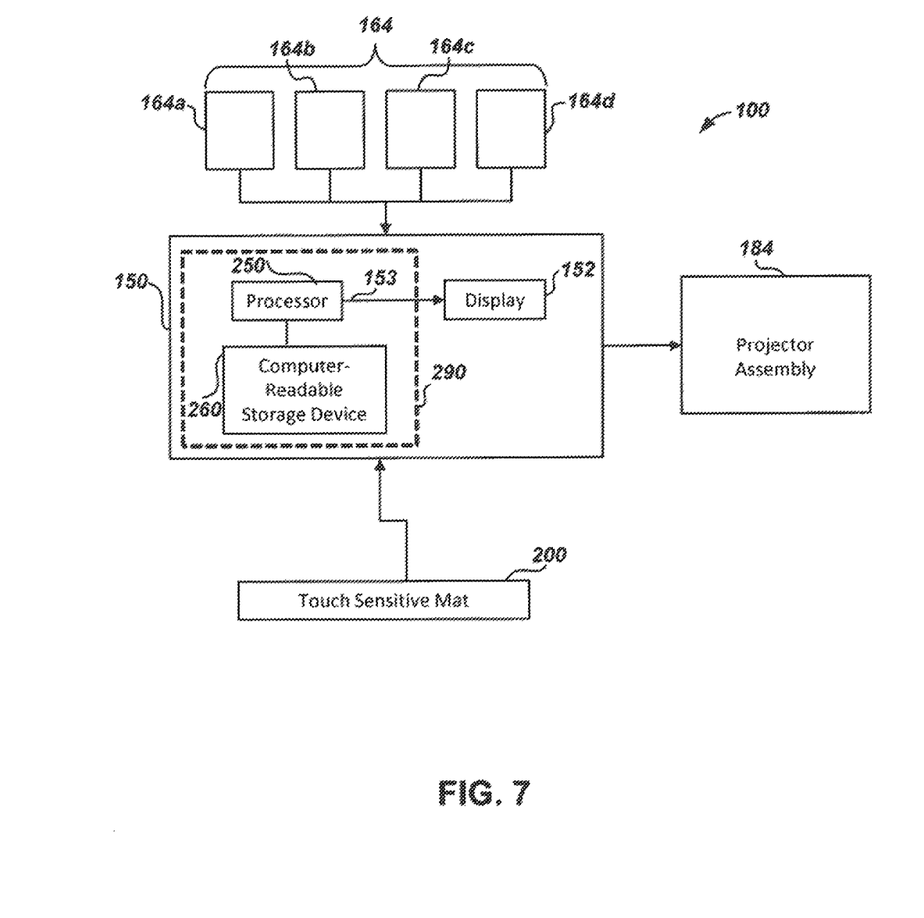
FIG. 7 is a black box circuit diagram of the computer system of FIG. 1 in accordance with the principles disclosed herein.

Referring now to FIGS. 5-7, in some examples, device 150 directs assembly 184 to project an image and/or user interface onto surface 202 of mat 200. In addition, device 150 may also display an image and/or user interface on the display 152 (which may or may not be the same as the image and/or user interface projected onto surface 202 by assembly 184). The image and/or user interface projected by assembly 184 may comprise information and/or images produced by software executing within device 150. A user (not shown)

may then interact with the image and/or user interface displayed on surface 202 and display 152 by physically engaging the touch sensitive surface 202 of mat 200. Such interaction may take place through any suitable method such as, direct interaction with a user's hand 35, through a stylus 25, or other suitable user input device(s).

As best shown in FIG. 7, when a user interacts with surface 202 of mat 200, a signal is generated which is routed to device 150 through any of the electrical coupling methods and devices previously described. Once device 150 receives the signal generated within mat 200, it is routed, through internal conductor paths 153, to a processor 250 which communicates with a non-transitory computer-readable storage device 260 to generate an output signal which is then routed back to projector assembly 184 and/or display 152 to implement a change in the image and/or user interface projected onto surface 202 and/or the image and/or user interface displayed on display 152, respectively. It should also be appreciated that the processor 250 may be at least one of a central processing unit (CPU), a semiconductor-based microprocessor, a graphics processing unit (GPU), a microcontroller, or another processing device configured to fetch, decode, and/or execute instructions retrieved from the non-transitory computer-readable storage device 260. It should also be appreciated that the non-transitory computer-readable storage device 260 may correspond to any typical storage device that stores machine-readable instructions, such as programming code, software, firmware, or the like. For example, the non-transitory computer-readable storage device 260 may include one or more of a non-volatile memory, a volatile memory, and/or a storage device. Examples of non-volatile memory include, but are not limited to, electronically erasable programmable read only memory (EEPROM) and read only memory (ROM). Examples of volatile memory include, but are not limited to, static random access memory (SRAM) and dynamic random access memory (DRAM). Examples of storage devices include, but are not limited to, hard disk drives, compact disc drives, digital versatile disc drives, optical devices, and flash memory devices. In some implementations, the instructions may be part of an installation package that can be executed by the processor 250. In this case, the non-transitory computer-readable storage device 260 may be a portable medium such as a CD, DVD, or flash drive or a memory maintained by a server from which the installation package can be downloaded and installed. In another implementation, the instructions may be part of an application or application already installed. Here, the non-transitory computer-readable storage device 260 may include integrated memory such as a hard drive. Furthermore, in some examples, the processor 250 is, integrated with the computer readable storage device 260, while in other examples, the processor 250 and the computer readable storage device 260 are discrete components.

In one example in accordance with aspects of the present disclosure, a user may toggle the touch input association such that touch input directed to the mat 200 may be associated with the horizontal user interface projected on the mat 200 by the projector assembly 184, or, alternatively, may be associated with the user interface displayed on the vertical display 152 (where the vertical display may or may not be touch sensitive). More specifically, and referring to FIG. 7, a touch input modification request may be received by a touch coordination module 290 comprising processor 250 and computer readable storage device 260. In response to the receiving the touch input modification request, the touch coordination module 290 may change the touch input association from the horizontal touch sensitive mat 200 to the vertical display 152 such that a touch input on the horizontal touch sensitive mat 200 controls the first interface displayed on vertical display 152 as opposed to the second interface projected onto the mat 200. Thereafter, in response to receiving another touch input modification request, the touch coordination module 290 may revert the touch input association from the vertical display 152 to the horizontal touch sensitive mat 200 such that a touch input on the horizontal touch sensitive mat 200 controls the second interface projected on the mat 200 as opposed to the first interface displayed on vertical display 152.

It should be understood that while FIG. 7 depicts the touch coordination module 290 as comprising only processor 250 and computer readable storage device 260, in various examples, the touch coordination module 290 comprises additional or alternative components. For example, the touch coordination module 290 may comprise a functionally equivalent circuit like an analog circuit, a digital signal processing device circuit, an application specific integrated circuit (ASIC), or other logic devices arranged to perform the same functions as the above-mentioned processor 250 and computer readable storage device 260.

Figure 8:
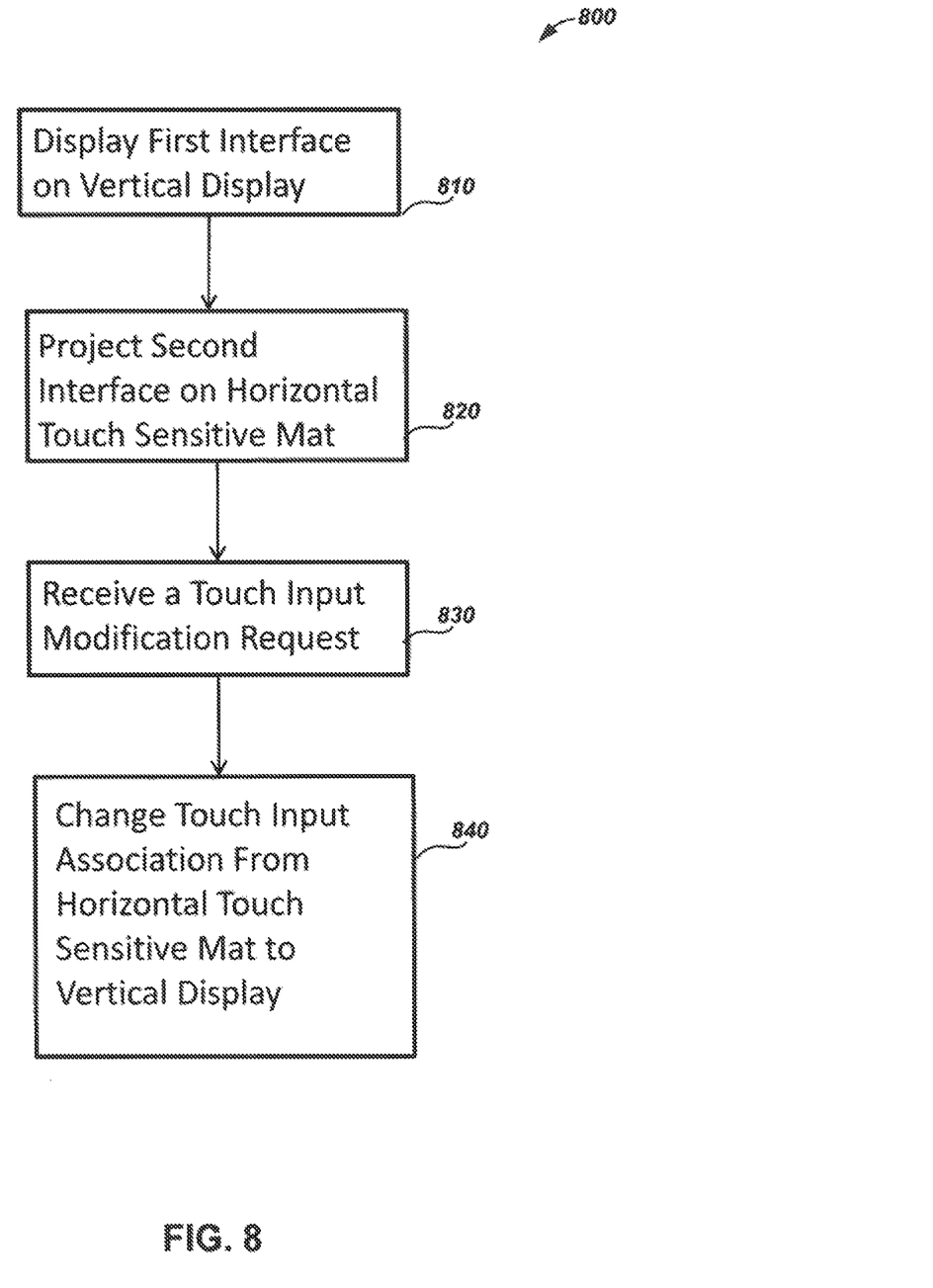
FIG. 8 is a process flow diagram of processes conducted by the system of FIG. 1 in accordance with the principles disclosed herein.

Turning now to FIG. 8, this figure depicts an example process flow diagram 800 for modifying touch input assignment in accordance with an example. It should be readily apparent that the processes depicted in FIG. 8 represent generalized illustrations, and that other processes may be added or existing processes may be removed, modified, or rearranged without departing from the scope and spirit of the present disclosure. Further, it should be understood that the processes may represent executable instructions stored on memory that may cause the projective computing system 100 to respond, to perform actions, to change states, and/or to make decisions. Thus, the described processes may be implemented as executable instructions and/or operations provided by a memory 260 associated with the system 100. Alternatively or in addition, the processes may represent functions and/or actions performed by functionally equivalent circuits like an analog circuit, a digital signal processing device circuit, an application specific integrated circuit (ASIC), or other logic devices associated with the system 100. Furthermore, FIG. 8 is not intended to limit the implementation of the described implementations, but rather the figure illustrates functional information one skilled in the art could use to design/fabricate circuits, generate software, or use a combination of hardware and software to perform the illustrated.

The process 800 may begin at block 810 where a first interface is displayed on the vertical display 152. As mentioned above, the vertical display may or may not be touch sensitive. At block 820, a second interface is projected on the horizontal touch sensitive mat 200. As discussed, the projector assembly 184 projects this user interface upward and it reflects off a mirror back down to the mat 200. At block 830, a touch input modification request is received. This request may be received at the touch coordination module 290 and may be triggered by a user gesture, a button depression, a verbal command, or another user input. For example, in one implementation, the 3D sensor 164d or another sensor may detect a particular gesture (e.g., hand/finger movement) by the user and this may trigger the touch input modification request. This gesture may occur on or above the mat, and may occur within or outside of the region 202. In another example implementation, the input modification request may be triggered by depression/touching of a button on the system 100. For example, a button may be located on the base 120 or another portion of the system, and a user may depress/touch this button to trigger the touch modification request, and thereby toggle the touch input assignment. This toggling may occur without the user needing to shutdown, logout, and/or reboot, and therefore provide the user with a user-friendly and seamless experience. In addition, the toggling may occur automatically and without further user interaction after, e.g., depression/touching the button or performing the predetermined toggling gesture.

Thereafter, at block 840, after receiving the touch input modification request, the touch coordination module 290 causes the touch input association to change from the horizontal touch sensitive mat 200 to the vertical display 152 such that a touch input on the horizontal touch sensitive mat 200 controls the first interface displayed on the vertical display 152. This may be accomplished, for example, by updating register values that associate interfaces/displays with touch inputs. These registers may be read, for example, by the operating system (OS) to coordinate touch input, user interface control, and/or information displayed.

In addition to the above, the touch assignment may be reverted back in response to receiving another touch input modification request. For example and continuing with the above example, in response to receiving another touch input modification request, the touch coordination module 290 may change the touch input association from the vertical display 152 to the horizontal touch sensitive mat 200 such that a touch input on the horizontal touch sensitive mat controls the second interface projected on the horizontal touch sensitive mat. As mentioned above, this may be accomplished, for example, by updating register values which associate interfaces/displays with touch inputs, and further may occur automatically without the user needing to shutdown, logout, and/or reboot the system 100.

Figure 9:
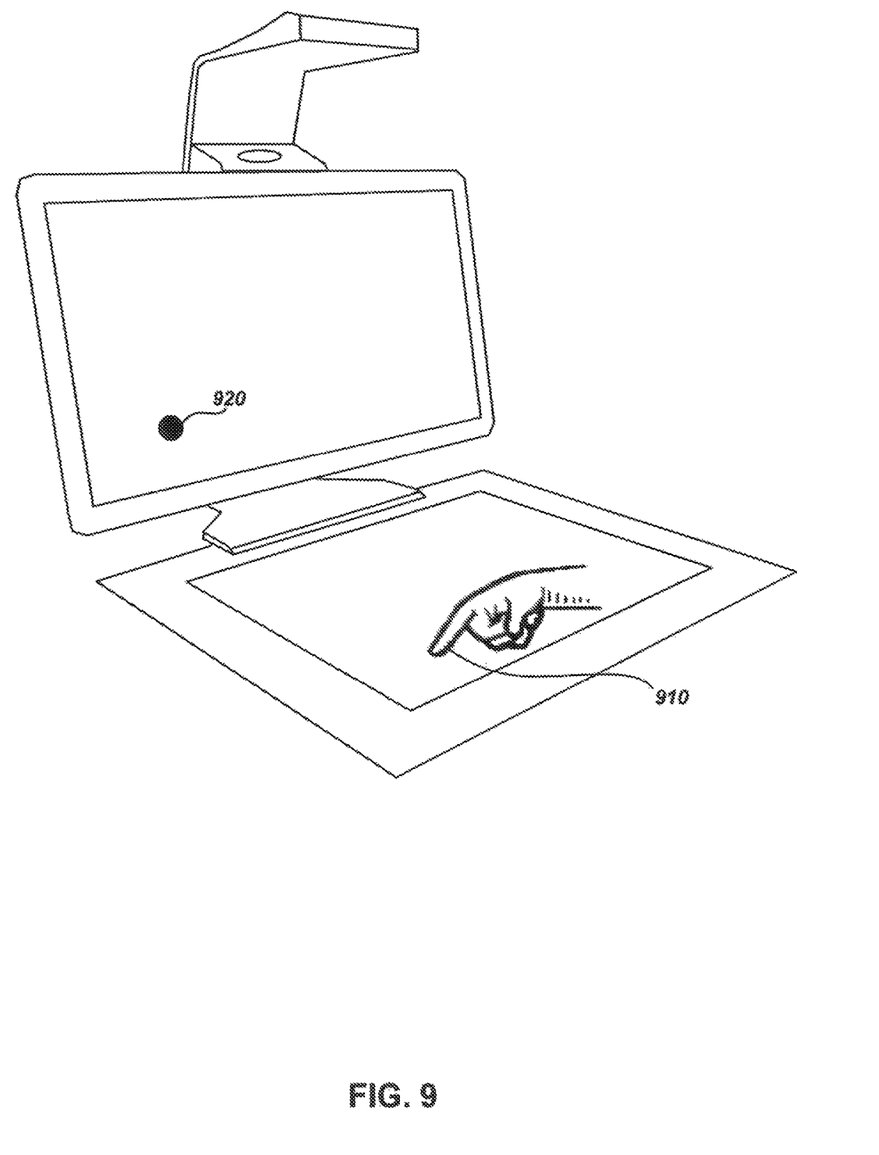
FIG. 9 is a schematic view showing a marker provided on the vertical display of the computer system of FIG. 1 when an input device is touching or proximate to the horizontal touch sensitive mat in accordance with the principles disclosed herein.

Also, to assist the user with understanding their finger/stylus location with respect to the vertical display 152 when the mat 200 is being utilized as a touch input, an example in accordance with the present disclosure causes a marker (e.g., a cursor, dot, etc.) to be shown on the vertical display 152 when an input device (e.g., finger, stylus, etc.) is touching or proximate to the horizontal touch sensitive mat. Thus, as shown in FIG. 9, when a user's finger 910 or stylus touches and/or is proximate to the mat 200 (e.g., within a threshold distance such as 1 inch), a marker 920 is shown on the vertical display 152 to provide an idea of finger/stylus positioning on the mat 200 with respect to the vertical display 152. In an example, the location of the users finger and/or stylus is detected by the 3D sensor 164*d* or another sensor associated with the system 100. Further, in an example, the marker is a cursor, dot, star, or another symbol.

Figure 10:
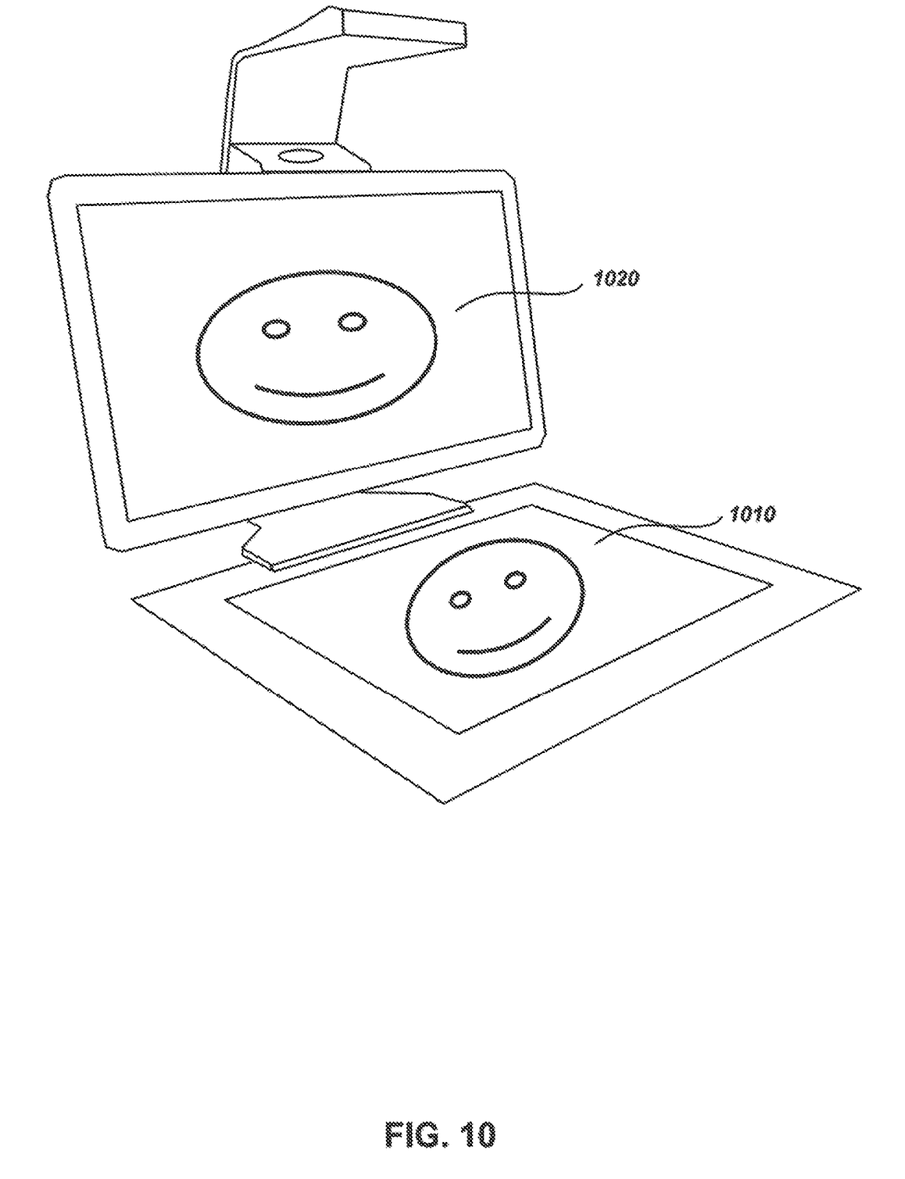
FIG. 10 is a schematic view showing a done on the vertical display projected onto the horizontal touch sensitive mat of the computer system of FIG. 1 in accordance with the principles disclosed herein.

Furthermore, in an additional example depicted in FIG. 10, in order to assist the user with referencing their position on the horizontal mat 200 with respect to the vertical display 152, a duplicate/clone of the first interface 1010 may be projected on all or a portion of the horizontal touch sensitive mat 200 while the touch input on the horizontal touch sensitive mat is controlling the first interface displayed on the vertical display. A user, thus, can utilize the projected duplicate/clone first interface to more easily control the actual first user interface 1020 displayed on the vertical display 152. It should be understood that while the clone/duplicate first interface is shown in FIG. 10 as encompassing the entire touch mat 200, in some examples, only a portion of the touch mat 200 is utilized for the clone display. For instance, the duplicate/clone first interface may be a "thumbnail" projected in the upper right hand quadrant of the touch mat 200 and the remaining portion of the touch mat may display the second interface. Such settings may be user configurable or set by default, depending on the implementation. Furthermore, in some examples, since the aspect ratio may differ between the projected display on the horizontal touch mat and the vertical display, processing may be conducted to alter the image based on the aspect ratio to provide an optimal appearance.

In the manner described, the projective computer system 100 comprises a touch sensitive or non-touch sensitive vertical display (e.g., AiO computer or display) to display a first interface, a horizontal touch sensitive mat communicatively coupled to the vertical display, and a projector assembly to project a second interface on the horizontal touch sensitive mat. Further, the system 100 includes a touch coordination module to receive a touch input modification request and in response to the receiving the touch input modification request, change the touch input association from the horizontal touch sensitive mat to the vertical display such that a touch input on the horizontal touch sensitive mat controls the first interface displayed on vertical display. Among other things, this architecture provides the user with an intuitive manner to change the touch association such that it is a more ergonomic input method, and further reduces manufacturing costs by reducing the need to have touch components included in both the horizontal and vertical surfaces. That is, the vertical display may be non-touch sensitive but have such capability by switching the touch association from the horizontal touch mat to the non-touch sensitive display.

While device 150 has been described as an all-in-one computer, it should be appreciated that in other examples, device 150 may further employ the use of more traditional user input devices such as, for example, a keyboard and a mouse. In addition, while sensors 164*a*, 164*b*, 164*c*, 164*d* within bundle 164 have been described as each representing a single sensor or camera, it should be appreciated that each of the sensors 164*a*, 164*b*, 164*c*, 164*d* may each include multiple sensors or cameras while still complying with the principles described herein. Further, while top 160 has been described herein as a cantilevered top, it should be appreciated that in other examples, top 160 may be supported at more than one point and is thus may not be cantilevered while still complying with the principles disclosed herein.

The above discussion is meant to be illustrative of the principles and various embodiments of the present disclosure. Numerous variations and modifications will become apparent to those skilled in the art once the above disclosure is fully appreciated. It is intended that the following claims be interpreted to embrace all such variations and modifications.

What is claimed is:

1. A projective computing system, comprising:
a vertical display of an all-in-one computer to display a first interface that displays a first image;
a horizontal touch sensitive mat communicatively coupled to the vertical all-in-one computer;
a projector assembly to project a second interface that displays a second image different from the first image on the horizontal touch sensitive mat;
a sensor located in the projector assembly to detect a touch input on the horizontal touch sensitive mat;
a processor; and
a non-transitory computer readable storage device storing instructions executed by the processor to:
receive a touch input modification request, and in response to receiving the touch input modification request; and automatically and without further input, change the touch input detected by the sensor and associated with the horizontal touch sensitive mat to the vertical all-in-one computer such that the touch input detected by the sensor located over the horizontal touch sensitive mat controls the first interface displayed on the vertical all-in-one computer via a signal that is generated in response to the touch input, wherein the signal is routed to the processor to generate an output signal that is routed to the vertical display to control a marker that is displayed on the vertical display.

2. The projective computing system of claim 1, wherein the touch input modification request is triggered by depression of a touch input toggle button.

3. The projective computing system of claim 1, wherein the touch input modification request is triggered by a gesture.

4. The projective computing system of claim 3, wherein the gesture is detected by a 3D sensor.

5. The projective computing system of claim 1, wherein the processor is further to, in response to receiving another touch input modification request, change the touch input association from the vertical display of the all-in-one computer to the horizontal touch sensitive mat such that a second touch input on the horizontal touch sensitive mat controls the second interface projected on the horizontal touch sensitive mat.

6. The projective computing system of claim 1, wherein the processor is further to cause the marker to be shown on the vertical display of the all-in-one computer when an input device is touching or proximate to the horizontal touch sensitive mat.

7. The projective computing system of claim 6, wherein the input device is a finger or a stylus, and wherein the location of the finger or the stylus is detected by a 3D sensor.

8. The projective computing system of claim 1, wherein the vertical display of the all-in-one computer is not touch sensitive.

9. The projective computing system of claim 1, wherein the vertical display of the all-in-one computer is touch sensitive.

10. A method to modify touch input in a projective computing system, comprising:
displaying a first interface that displays a first image on a non-touch sensitive vertical display;
projecting a second interface that displays a second image different from the first image on a horizontal touch sensitive mat;
receiving a touch input modification request;
changing a touch input association from the horizontal touch sensitive mat to the non-touch sensitive vertical display such that a touch input on the horizontal touch sensitive mat controls the first interface displayed on the non-touch sensitive vertical display;
detecting the touch input via a sensor located above the horizontal touch sensitive mat in a projector assembly;
generating a signal in response to the touch input that is detected on the horizontal touch sensitive mat via the sensor;
routing the signal to a processor to generate an output signal; and
routing the output signal to the non-touch sensitive vertical display to control a marker that is displayed on the non-touch sensitive vertical display.

11. The method of claim 10, further comprising:
receiving another touch input modification request; and
changing the touch input association from the non-touch sensitive vertical display to the horizontal touch sensitive mat such that a second touch input on the horizontal touch sensitive mat controls the second interface projected on the horizontal touch sensitive mat.

12. The method of claim 10, further comprising:
displaying the marker on the non-touch sensitive vertical display when an input device is touching or proximate to the horizontal touch sensitive mat.

13. A non-transitory computer readable storage device comprising instructions which when executed cause a projective computing system to:
receive a touch input modification request;
change a touch input association from a horizontal touch sensitive mat to a non-touch sensitive vertical display such that a touch input on the horizontal touch sensitive mat detected by a sensor located above the horizontal touch sensitive mat in a projector assembly controls a marker displayed in a first interface that displays a first image displayed on the non-touch sensitive vertical display via a signal that is generated in response to the touch input, wherein the signal is routed to the processor to generate an output signal that is routed to the non-touch sensitive vertical display to control a marker that is displayed on the non-touch sensitive vertical display;
receive another touch input modification request; and
change the touch input association from the non-touch sensitive vertical display to the horizontal touch sensitive mat such that a second touch input detected by the sensor located over the horizontal touch sensitive mat controls a second interface that displays a second image projected on the horizontal touch sensitive mat, wherein the second image is different from the first image.

* * * * *